United States Patent [19]
Doi et al.

[11] Patent Number: 6,148,215
[45] Date of Patent: Nov. 14, 2000

[54] MOBILE COMMUNICATION TERMINAL

[75] Inventors: Masayuki Doi; Yoshiko Yamada, both of Tokyo, Japan

[73] Assignee: Mitsubishi Denki Kabushiki Kaisha, Tokyo, Japan

[21] Appl. No.: 09/461,371

[22] Filed: Dec. 15, 1999

Related U.S. Application Data

[63] Continuation of application No. PCT/JP98/05216, Nov. 19, 1998.

[51] Int. Cl.$^7$ ...................................................... H04B 1/40
[52] U.S. Cl. ........................... 455/553; 455/574; 455/343; 370/311
[58] Field of Search ..................................... 455/553, 572, 455/574, 343, 38.3; 370/311; 375/216; 710/60

[56] References Cited

U.S. PATENT DOCUMENTS 5,778,218  7/1998  Gulick ........................................ 710/60
5,949,812  9/1999  Turney et al. ........................... 455/343

FOREIGN PATENT DOCUMENTS

| | | |
|---|---|---|
| 59-200537 | 11/1984 | Japan . |
| 63-98297 | 4/1988 | Japan . |
| 4-90230 | 8/1992 | Japan . |
| 6-12158 | 1/1994 | Japan . |
| 6-97835 | 4/1994 | Japan . |
| 10-313264 | 11/1998 | Japan . |

*Primary Examiner*—Nguyen Vo
*Assistant Examiner*—Lester G. Kincaid
*Attorney, Agent, or Firm*—Rothwell, Figg, Ernst & Manbeck

[57] ABSTRACT

The invention concerns a mobile communication terminal for use in mobile communication or mobile satellite communication. In the mobile communication terminal provided with a DSP for processing a communication signal according to the mode of communication, a CPU for indicating the communication mode to the DSP, and a clock generator for supplying a clock signal to the DSP, the clock generator changes the clock signal for the DSP in response to a request for changing the frequency from the DSP based on the communication mode.

10 Claims, 5 Drawing Sheets

MOBILE COMMUNICATION TERMINAL

CROSS-REFERENCE TO THE RELATED APPLICATION

This Application is a continuation of International Application No. PCT/JP98/05216, whose international filing date is Nov. 19, 1998, the disclosures of which Application are incorporated by reference therein. The benefit of the filing and priority dates of the International Application is respectfully requested.

BACKGROUND OF THE INVENTION

1. Field of the Invention

The present invention relates to a mobile communication terminal for conducting radio communication over a mobile communication network or mobile satellite communication network.

2. Description of the Background Art

Conventionally, in the mobile communication the mobile communication terminal conducts radio communication with a base station, and in the mobile satellite communication it communicates with the base station via a satellite. In the radio communication there are set various modes of communication corresponding to the contents of communication, such as a standby mode in which to stand by for a communication, a channel switching communication mode and a packet communication mode.

FIG. 6 shows various modes of communication that are used in the mobile communication terminal. These modes require high-speed signal processing which involves complex operations on various digital signals; such processing is usually carried out using a DSP (Digital Signal Processor).

FIG. 7 depicts DSP clock frequencies necessary for operating the DSP in the mobile communication terminal in various modes of communication services. Since the modes of communication are different in the amounts of data and the contents of operations that the DSP processes, the DSP clock frequencies that are needed in the individual modes take different values. As indicated by the value "a" in FIG. 7, the required value of the DSP clock frequency in the standby mode is usually lower than in any other modes. In FIG. 7, the required values "b" and "c" of the DSP clock frequency in a high speed data communication mode and a voice communication mode are shown together with the standby mode, such that the clock value increases in the order of "a"–"b"–"c" for convenience of explanation. And, in the conventional mobile communication terminal the DSP clock frequency is fixed at the maximum clock frequency value "c" that covers all modes of communication services.

Since the conventional mobile communication terminal uses the DSP clock fixed at the maximum clock frequency that covers all the modes of communication services as mentioned above, the DSP power consumption is constant irrespective of the modes of communication services and is heavy. On the other hand, the necessary DSP clock frequency in each communication mode, for example, in the standby mode, may be the minimum value "a" as depicted in FIG. 7, and in the high speed data communication mode and in the voice communication mode, the clock frequency needs only to be set partly high (the values "b" and "c"). Since the power consumption in the DSP fluctuates with the clock frequency value, the power which is included in the DSP power consumption and corresponds to the shaded area in FIG. 7, goes to waste. Accordingly, taking account of the fact that the time of the standby mode is very longer than the times of the other communication modes, the rate of power wasted by the DSP, that is, the rate of wastage of the DSP power consumption is appreciably great as follows:

(Rate of wastage of DSP power consumption)=$(1-a/c)\times100(\%)$

The present invention is intended to provide a mobile communication terminal for radio communications in various communication modes, which may reduce the DSP power consumption.

SUMMARY OF THE INVENTION

The mobile communication terminal according to the present invention comprises a DSP which processes a communication signal in accordance with a particular communication mode, a CPU which indicates the communication mode to the DSP, and a clock generator which supplies a clock signal to the DSP; the clock generator changes the frequency of the clock signal for supply to the DSP in response to a request from the DSP for a frequency change corresponding to the communication mode. With this arrangement, the frequency of the clock signal that is fed to the DSP from the clock generator can be set at a value that is needed for each mode of communication, and hence the power consumption by the DSP can be reduced.

The clock generator is provided with a phase locked loop, and changes the frequency dividing number that is set in a frequency divider of the phase locked loop. With this arrangement, the frequency of the clock signal that is fed to the DSP from the clock generator can be set at a value that is needed for each mode of communication, and hence the power consumption by the DSP can be reduced.

In a mobile communication terminal comprising a DSP which processes a communication signal in accordance with a particular communication mode, a CPU which indicates the communication mode to the DSP, and a clock generator which supplies a clock signal to the DSP; the DSP is provided with a phase locked loop and changes the frequency dividing number to be set in a frequency divider of the phase locked loop, thereby changing the frequency of the clock signal from the clock generator. With this arrangement, the frequency of the clock signal that is fed to the DSP from the clock generator can be set at a value that is needed for each mode of communication, and hence the power consumption by the DSP can be reduced.

Based on the timing of a frame signal for signal processing that is supplied thereto from the CPU, the DSP changes the frequency dividing number to be set in the frequency divider of the phase locked loop. With this arrangement, the frequency of the clock signal that is fed to the DSP from the clock generator can be set at a value that is needed for each mode of communication, and hence the power consumption by the DSP can be reduced; furthermore, part of data on the communication signal will not drop out in the change of the clock signal frequency.

DETAILED DESCRIPTION OF THE PREFERRED EMBODIMENTS

The present invention will be described below in more detail with reference to the accompanying drawings.

Figure 1:
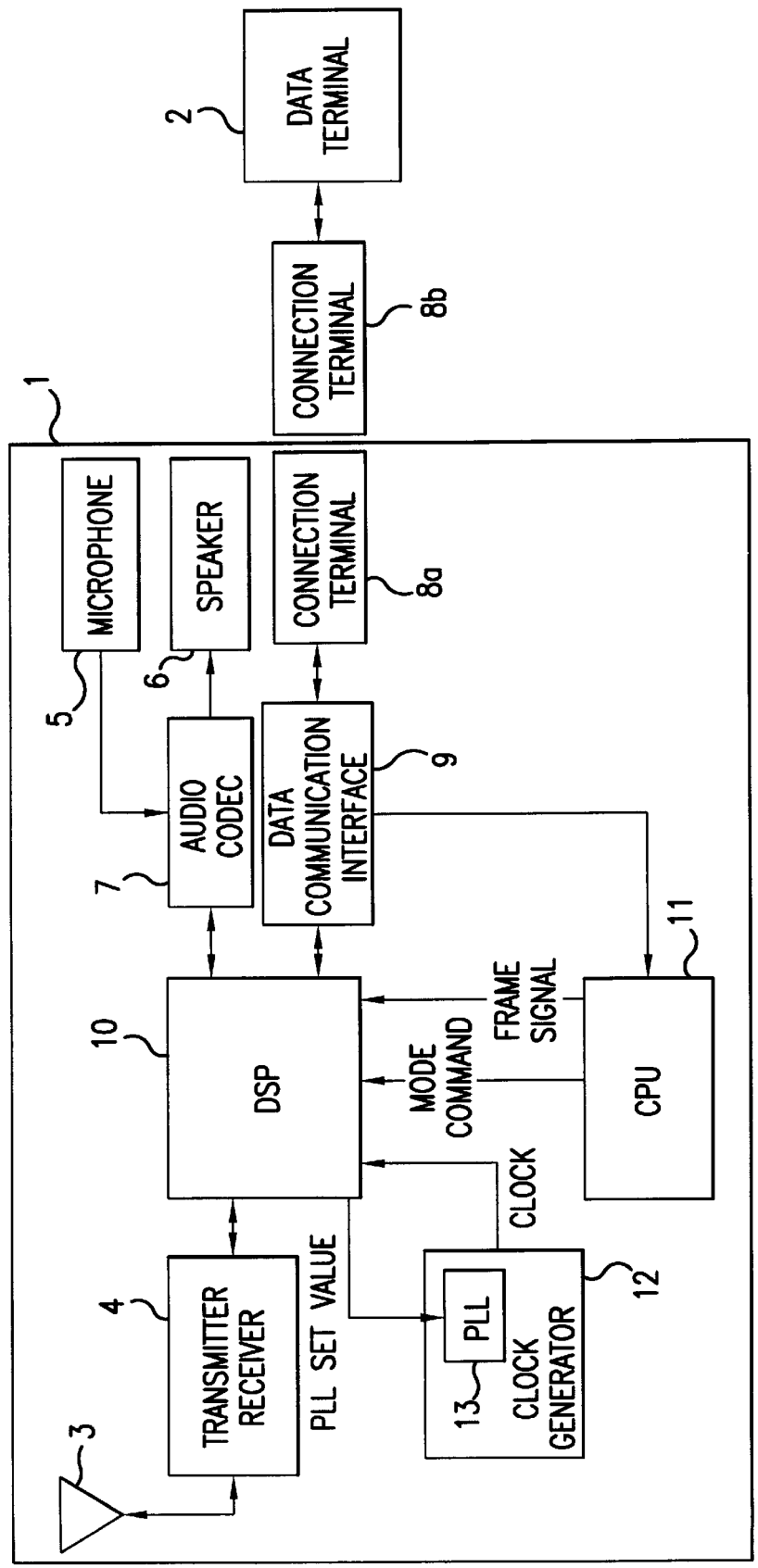
FIG. 1 is a block diagram of a mobile communication terminal according to Embodiment 1 of the present invention.
Figure 2:
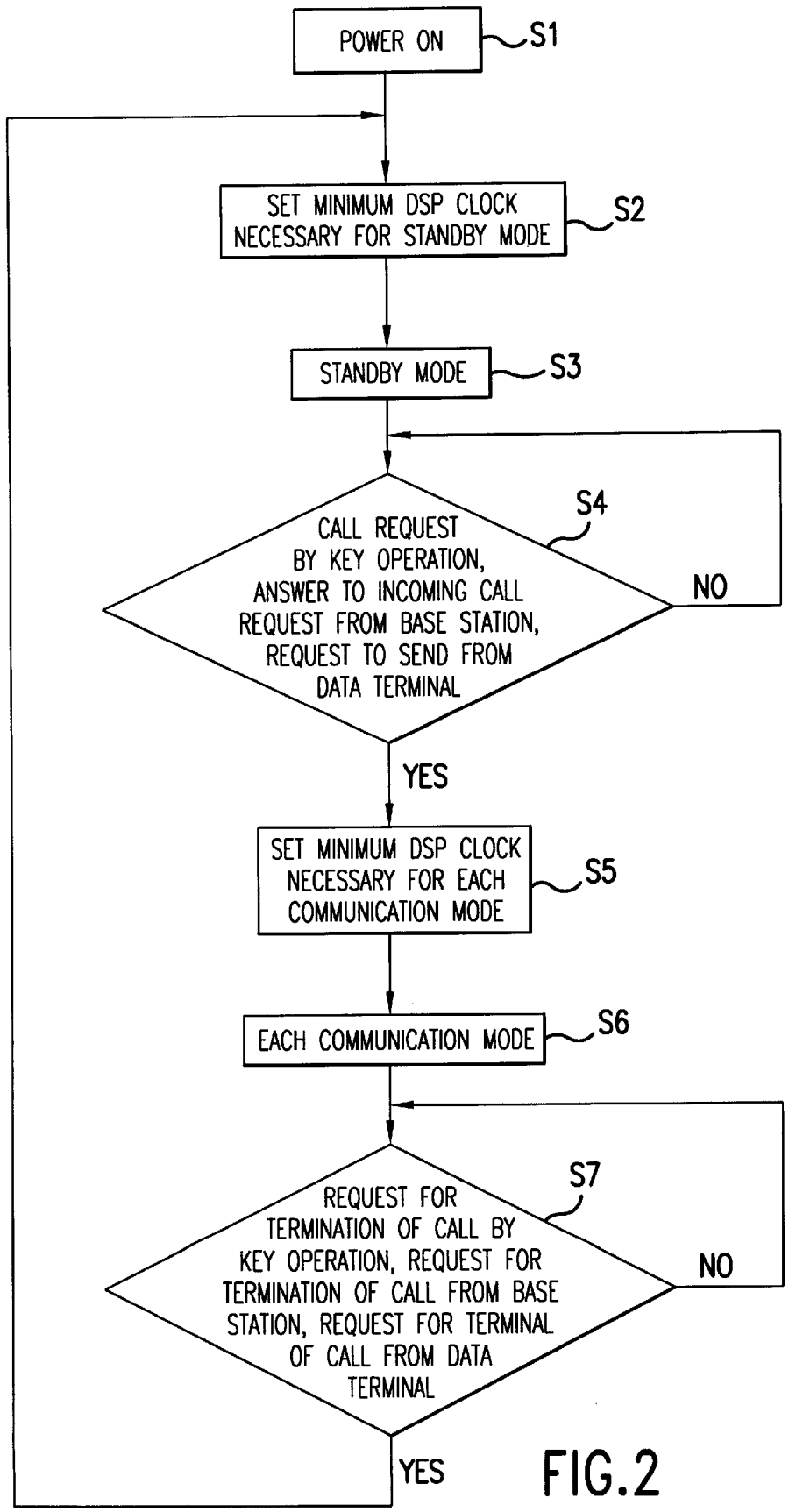
FIG. 2 is a flowchart depicting a control algorithm for the mobile communication terminal according to Embodiment 1 of the present invention.

FIG. 1 is a block diagram of the mobile communication terminal according to Embodiment 1 of the present invention. In FIG. 1, reference numeral 1 denotes the mobile communication terminal according to the present invention, and 2 a data terminal that is used to conduct data communications in a low speed data communication mode, high speed data communication mode, a packet communication mode, and so forth. Reference numeral 3 denotes an antenna for radio communication with a base station or satellite station, and 4 a transmitter-receiver. Reference numeral 5 denotes a microphone, 6 a speaker, and 7 a CODEC which codes and decodes a speech signal. Reference numeral 8a a connection terminal for connecting the data terminal 2 and the mobile communication terminal 1, and 8b a connection terminal at the side of the data terminal 2. Reference numeral 9 denotes a data communication interface through which communication data and control signals are transmitted between the data terminal 2 and the mobile communication terminal 1. Reference numeral 10 denotes a DSP which performs digital signal processing in accordance with each communication mode. The DSP 10 possesses capabilities mainly for phase modulation-demodulation, amplitude modulation-demodulation and phase/amplitude modulation-demodulation, and it may also contain the function of the CODEC 7. Reference numeral 11 denotes a controller (hereinafter referred to as a "CPU") which outputs a frame signal of a communication signal to the DSP 10 and indicates thereto the communication mode. The CPU 11 further receives a control signal from the data communication interface 9, and sets the operation timing of the DSP 10 and the contents of its signal processing. Incidentally, the start and end of a voice communication by the operation of a key I/F of the mobile communication terminal 1 are also placed under the control of the CPU 11, though not shown in FIG. 1. Reference numeral 12 denotes a clock generator for generating a plurality of clock signals of different frequencies which are required by the DSP 10, and in FIG. 1 it is shown to have a phase locked loop (identified as PLL in FIG. 1) 13. FIG. 2 shows a control algorithm for the CPU 11 in the mobile communication terminal 1.

Next, the operation of the mobile communication terminal 1 depicted in FIG. 1 will be described following the algorithm of FIG. 2. In step S1 in FIG. 2, the mobile communication terminal 1 is switched on, after which data is exchanged between the mobile communication terminal 1 and a base station or satellite station to register the initial position of the former with the latter; upon completion of the position registration, the clock frequency to be supplied to the DSP 10 is set at the minimum value necessary for the standby mode in step S2, and in step S3 the mobile communication terminal 1 enters the standby state. Then, in step S4 the CPU 11 monitors key operations of a user, an called (incoming call) request from the base or satellite station, a request for data communication from the data terminal 2, and so forth. The CPU 11 sets the communication mode of the mobile communication terminal 1 according to the condition being monitored, and commands the DSP 10 to perform processing of a communication signal in the communication mode. In the transition period to a voice communication mode, the CPU 11 monitors a calling request by a key operation of the user of the mobile communication terminal 1, or an answer of the user to an called request from the base or satellite station received by the antenna 3 and the transmitter-receiver 4. If such a request or answer is detected, then the CPU 11 informs the DSP 10 that the mobile communication terminal is in the voice communication mode; and in step S5 the clock frequency to be fed to the DSP 10 is set at the minimum value necessary for the voice communication mode, and the CPU 11 sends to the DSP 10 the frame signal that is needed for the processing of signals to be sent and received in the voice communication, followed by a shift to step S6 in which to establish the communication mode concerned. In the transition period to a data communication or packet communication mode, the CPU 11 monitors a sending request by a control signal from the data terminal 2 connected via the connection terminals 8a and 8b, or an answer of the user or the data terminal 2 to a request for data communication or packet communication from the base or satellite station received by the antenna 3 and the transmitter-receiver 4. If such a request or answer is detected, the CPU 11 informs the DSP 10 that the mobile communication terminal is in the data communication or packet communication mode; and in step S5 the clock frequency to be fed to the DSP 10 is set at the minimum value necessary for the data communication or packet communication mode, and the CPU 11 sends to the DSP 10 a frame signal that is needed for the processing of signals to be sent and received in the data communication or packet communication, followed by a shift to step S6 in which to establish the communication mode concerned. After the start of communication, in step S7 the CPU 11 monitors a termination-of-a-call request by a key operation of the user, a termination-of-a-call request from the base or satellite station, or a termination-of-a-call request from the data terminal 2; if such a request is detected, the CPU puts an end to the communication, followed by a return to step S2.

Figure 3:
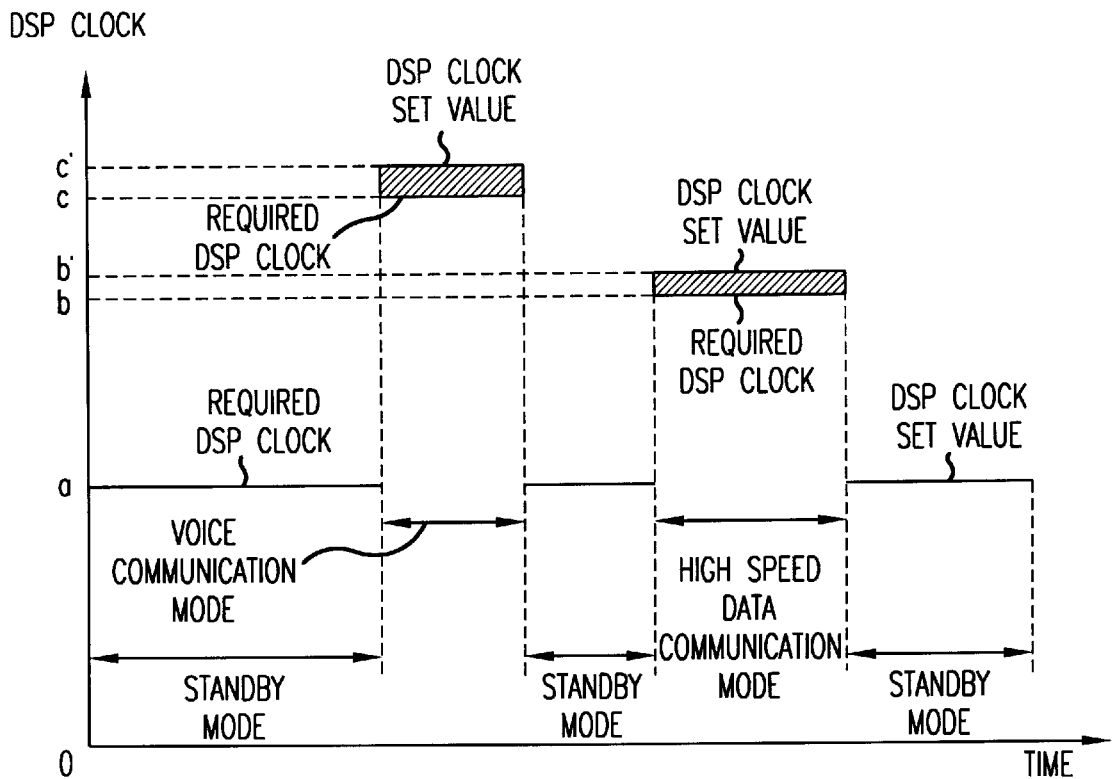
FIG. 3 is a diagram showing the relationships between clock frequencies necessary for various modes of communication of the DSP of the mobile communication terminal according to Embodiment 1 of the present invention and clock frequencies to be actually set.

In each of steps S2 and S5 in the algorithm of FIG. 2, the setting of the clock frequency to be supplied to the DSP 10 is changed with the particular communication mode to the minimum value necessary for the signal processing in that communication mode. FIG. 3 is a diagram showing the minimum clock frequencies necessary for the signal processing that are set in the above steps. As depicted in FIG. 3, the frequency of the clock signal which is fed to the DSP 10 is set at the minimum value in the standby mode and is partly at the maximum value in the voice communication mode and in the high speed data communication mode. The clock which is actually set uses the clock signal for the standby state as a reference clock, and is set at a frequency higher than the clock signal that is needed in each communication mode. Since the phase locked loop has a few steps of the multiplication numbers that are usually used for changing the clock frequency, the required clock frequency and the clock frequency which is actually set do not always match. In this instance, the frequency dividing number is set such that the clock frequency for each mode is somewhat higher than the value that is actually needed. For example, a clock frequency "c'" for the voice communication mode is set higher than the clock frequency "c" that is actually needed. In the standby mode, the prior art supplies the clock signal of the "c" value to the DSP 10, whereas the present invention sets the clock frequency for the DSP 10 at the value "a" and hence permits reduction of the power consumption. Furthermore, taking account of the fact that the time of the standby mode is longer than the times of the other communication modes, the power consumption by the DSP is negligibly small; therefore, it is possible to drastically decrease the power consumption by the DSP that has been wasted in the conventional mobile communication terminal.

Figure 4:
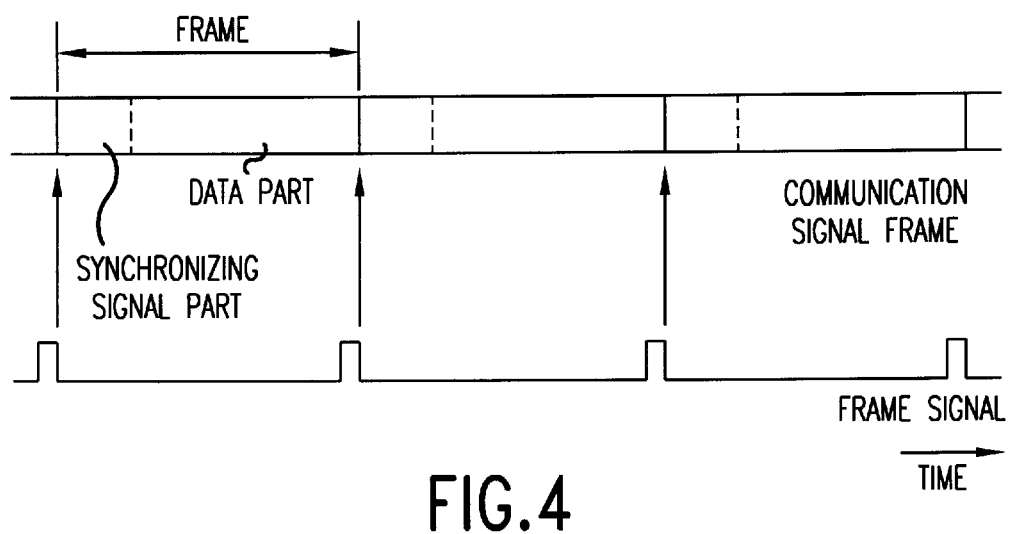
FIG. 4 is a schematic diagram depicting the frame of the communication signal of the mobile communication terminal according to Embodiment 1 of the present invention and a frame signal that is fed from the CPU to the DSP.

The change of the setting of the clock frequency to be fed to the DSP 10 is made by an instruction that is given from the DSP 10 to the clock generator 12. The DSP 10 has received a communication mode command from the CPU 11, and based on this command, instructs the clock generator 12 to change the frequency of the clock signal. In response to the mode command that is a basic command from the CPU 11, the DSP 10, which is a peripheral circuit, thereafter independently exercises detailed control for changing the setting of the clock frequency, for setting of signal processing, and so on; hence, the functions of the CPU 11 and the I/F between the CPU 11 and the DSP 10 will not become complex. Incidentally, the signal that is sent from the CPU 11 to the DSP 10 includes a frame signal in addition to the above-mentioned mode command. In each communication mode in the mobile communication terminal 1, the communication signal is handled on a framewise basis. As depicted in FIG. 4, each frame of the communication signal is composed of, for example, a synchronizing signal part and a data part, and the DSP 10 processes the communication signal at the timing of the frame signal that is fed from the CPU 11. By changing the setting of the clock frequency at the start or end of the frame signal, there is no possibility that the setting of the clock frequency is changed, for example, halfway through the last frame, resulting in a dropout of the communication data.

To change the setting of the clock frequency in the clock generator 12, it is possible, of course, to place therein and switch a plurality of crystal oscillators of different oscillation frequencies; however, it is common to employ a phase locked loop by which a clock from a crystal oscillator oscillating at a particular frequency is frequency divided phase-synchronously. By changing the setting of the frequency dividing number that is set in a frequency divider in the phase locked loop 13, the clock frequency which is applied from the clock generator 12 to the DSP 10 can be changed.

Incidentally, the DSP 10 may have the clock generator 12 built-in.

Next, a description will be given, with reference to FIG. 5, of a mobile communication terminal according to another embodiment of the present invention.

Figure 5:
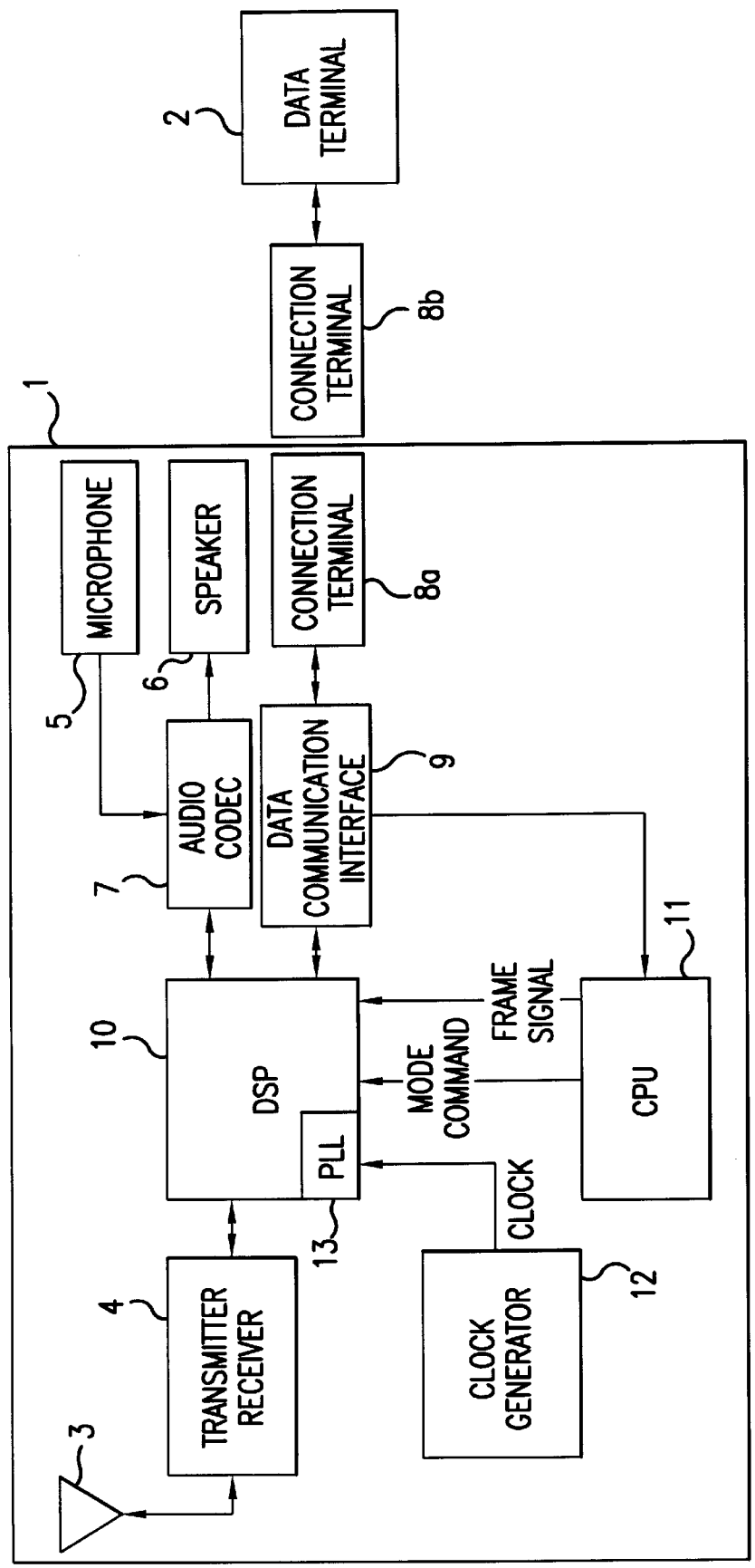
FIG. 5 is a block diagram of a mobile communication terminal according to Embodiment 2 of the present invention.
Figures 6, 7:
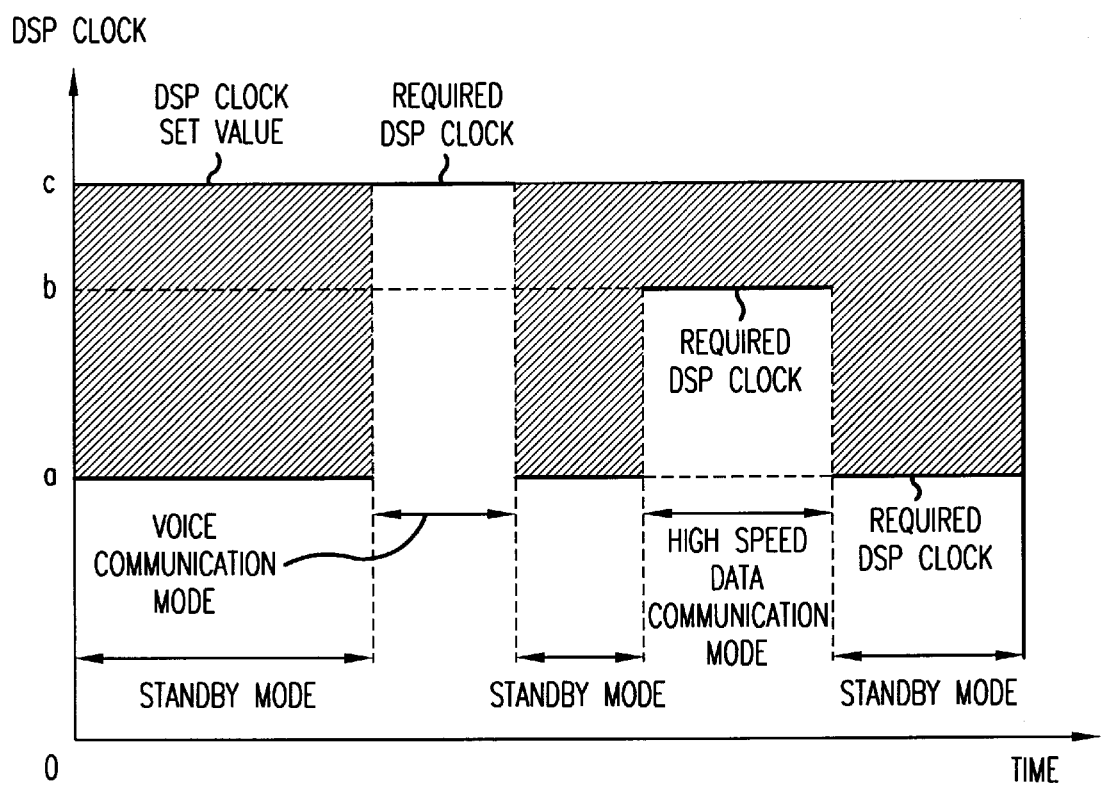
FIG. 6 is a system diagram showing an example of the classification of various modes of communication in the field of utilization of the prior art and the present invention.
FIG. 7 is a diagram showing the relationships between clock frequencies necessary for various modes of communication of a DSP of a conventional mobile communication terminal and clock frequencies to be actually set.

In FIG. 5 the phase locked loop 13 is incorporated in the DSP 10. The command which is sent from the DSP 10 to the phase locked loop 13 to change the setting of the clock frequency concludes in the DSP. While FIG. 5 shows a configuration in which the clock generator 12 supplies the clock to the phase locked loop 13 from the outside thereof, the clock generator 12 may also be placed in the DSP 10.

In the case where the capabilities for changing the setting of the clock frequency are incorporated in the DSP 10, their external control is impossible, which results in an inconvenience that the clock frequency cannot be forced to change, for example, in testing the DSP alone during manufacture; it is possible, as a solution to this problem, to provide an input terminal in the DSP 10 for appropriately changing the frequency dividing number of the phase locked loop 13 in the DSP 10. This input terminal may also be connected to the CPU 11 so that the setting of the frequency dividing number can be forcefully changed by the CPU 11.

Incidentally, the signal that is sent from the CPU 11 to the DSP 10 includes a frame signal in addition to the above-mentioned mode command. In each communication mode in the mobile communication terminal 1, the communication signal is handled on a framewise basis. As depicted in FIG. 4, each frame of the communication signal is composed of, for example, a synchronizing signal part and a data part, and the DSP 10 processes the communication signal at the timing of the frame signal that is fed from the CPU 11. By changing the setting of the clock frequency at the start or end of the frame signal, there is no possibility that the setting of the clock frequency is changed, for example, halfway through the last frame, resulting in a dropout of the communication data.

As described above, the mobile communication terminal according to the present invention is suitable for use in terrestrial mobile communications and in satellite mobile communications as a mobile communication terminal which sets the frequency of the clock signal to be fed to the DSP at the required minimum value in each communication mode and hence permits reduction of power consumption.

What is claimed is:

1. A mobile communication terminal having more than two communication modes, comprising:
    a CPU for selecting a communication mode from said more than two communication modes and supplying a frame signal for signal processing;
    a DSP for processing a communication signal on a framewise basis in accordance with said selected communication mode; and
    a clock generator for supplying to said DSP a clock signal, a frequency of said clock signal being determined in accordance with said selected communication mode and changed on a basis of a timing of said frame signal.

2. A mobile communication terminal as claimed in claim 1, wherein said DSP generates a request for frequency changing; and
    said clock generator changes said frequency of said clock signal on a basis of the said request for frequency changing.

3. A mobile communication terminal as claimed in claim 2, wherein said clock generator comprises a phase locked loop including a variable frequency divider, a frequency dividing number that is set in said frequency divider is changed on a basis of said request for frequency changing.

4. A mobile communication terminal as claimed in claim 1, wherein said DSP modulates or demodulates said communication signal in accordance with said selected communication mode.

5. A mobile communication terminal as claimed in claim 1, wherein said communication modes selected by said CPU are composed of a standby mode and at least one of a data communication mode and a voice communication mode; and
    said clock generator supplies the clock signal when the standby mode is selected, having lower frequency than the clock signal generated when the data communication mode or the voice communication mode is selected.

6. A mobile communication terminal as claimed in claim 5, wherein the frequency of said clock signal at each mode is desided so that difference at the standby mode between the frequency of said clock signal and a frequency needed at least for signal processing is less than that at the data communication mode or the voice communication mode.

7. A mobile communication terminal having more than two communication modes, comprising:
- a CPU for selecting a communication mode from said more than two communication modes and supplying a frame signal for signal processing;
- a DSP for processing a communication signal on a frame-wise basis in accordance with said selected communication mode; and
- a clock generator for supplying to said DSP a clock signal, a frequency of said clock signal being predetermined;
    wherein said DSP includes a phase locked loop for frequency dividing said clock signal and a frequency dividing number set in said phase locked loop is changed on a basis of a timing of said frame signal, to a number determined in accordance with said selected communication mode.

8. A mobile communication terminal as claimed in claim 7, wherein said DSP modulates or demodulates said communication signal in accordance with said selected communication mode.

9. A mobile communication terminal as claimed in claim 7, wherein said communication modes selected by said CPU are composed of a standby mode and at least one of a data communication mode and a voice communication mode; and
   the frequency dividing number set in said phase locked loop at the standby mode is more than that at the data communication mode or the voice communication mode.

10. A mobile communication terminal as claimed in claim 9, wherein said frequency dividing number set at each mode is desided so that difference at the standby mode between the frequency of said clock signal and a frequency needed at least for signal processing is less than that at the data communication mode or the voice communication mode.

\* \* \* \* \*